(12) United States Patent
Letourneau

(10) Patent No.: US 12,513,844 B1
(45) Date of Patent: Dec. 30, 2025

(54) BRACKET ASSEMBLY FOR MOUNTING ELECTRONICS UNITS IN RACKS

(71) Applicant: Nokia Solutions and Networks Oy, Espoo (FI)

(72) Inventor: Fabien Letourneau, Gatineau (CA)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/903,179

(22) Filed: Oct. 1, 2024

(51) Int. Cl.
*H05K 7/14* (2006.01)

(52) U.S. Cl.
CPC .................................. *H05K 7/14* (2013.01)

(58) Field of Classification Search
CPC ........................................................ H05K 7/14
USPC ............................................................ 211/26
See application file for complete search history.

(56) References Cited

U.S. PATENT DOCUMENTS

| | | | | |
|---|---|---|---|---|
| 4,683,520 A * | 7/1987 | Grassens | ................... | H02B 1/54 248/629 |
| 4,713,714 A * | 12/1987 | Gatti | ...................... | G11B 33/08 360/99.18 |
| 4,896,777 A * | 1/1990 | Lewis | .................... | G11B 33/08 361/759 |
| 5,131,619 A * | 7/1992 | Daugherty | ............. | F16F 1/3605 |
| 5,599,080 A * | 2/1997 | Ho | ...................... | G11B 33/124 312/334.7 |
| 5,801,920 A * | 9/1998 | Lee | ........................ | G11B 33/128 |
| 6,220,456 B1 * | 4/2001 | Jensen | ................... | H05K 7/1418 361/829 |
| 6,318,679 B1 * | 11/2001 | Yang | ........................ | G06F 1/187 248/27.3 |
| 6,619,766 B1 * | 9/2003 | Mansueto | ............... | G06F 1/184 312/333 |
| 6,762,932 B2 * | 7/2004 | Regimbal | ............... | G06F 1/184 361/752 |
| 6,788,539 B2 * | 9/2004 | Skofljanec | ........... | H05K 5/0039 165/185 |
| 6,882,528 B2 * | 4/2005 | Chuang | ................... | G11B 33/08 720/651 |
| 6,893,213 B1 | 5/2005 | Quill et al. | | |
| 7,130,187 B1 * | 10/2006 | Sun | ........................ | G06F 1/187 248/560 |
| 7,134,558 B1 * | 11/2006 | Mimlitch, III | ....... | H05K 7/1489 211/189 |
| 7,137,767 B2 * | 11/2006 | Franke | .................... | G06F 1/187 411/401 |
| 7,237,246 B2 * | 6/2007 | Chang | .................... | G11B 7/082 720/611 |
| 7,330,358 B2 * | 2/2008 | Chen | ...................... | H05K 7/142 361/752 |

(Continued)

*Primary Examiner* — Stanton L Krycinski
(74) *Attorney, Agent, or Firm* — Mendelsohn Dunleavy, P.C.; Steve Mendelsohn

(57) ABSTRACT

A bracket assembly for mounting an electronics unit onto a rack includes (i) a bracket having a rack flange and a unit flange connected to the rack flange and (ii) a plurality of standoffs. The rack flange is configured to be mounted to a vertical post of the rack, and the unit flange is configured to be mounted to a sidewall of the electronics unit with the standoffs interposed between the bracket's unit flange and the electronics unit's sidewall to create an air gap between the electronics unit and the bracket that enhances passive and/or active cooling of the electronics unit.

6 Claims, 6 Drawing Sheets

(56) References Cited

U.S. PATENT DOCUMENTS

| | | | | |
|---|---|---|---|---|
| 7,408,770 | B2 * | 8/2008 | Peng | G11B 33/124 361/679.33 |
| 7,447,010 | B2 * | 11/2008 | Chen | G06F 1/187 720/639 |
| 7,611,100 | B2 * | 11/2009 | Peng | G11B 33/124 361/679.02 |
| 7,616,436 | B2 * | 11/2009 | DeMoss | G06F 1/187 312/223.1 |
| 7,889,491 | B2 * | 2/2011 | Chiang | G11B 33/08 362/277 |
| 7,921,996 | B2 * | 4/2011 | Seo | H05K 5/0204 206/320 |
| 7,974,089 | B2 * | 7/2011 | Dai | G06F 1/187 312/332.1 |
| 8,152,127 | B2 * | 4/2012 | Chang | G06F 1/182 248/560 |
| 8,213,174 | B1 * | 7/2012 | Kapahi | G06F 1/183 361/759 |
| 8,248,778 | B2 * | 8/2012 | Dai | G11B 33/124 248/220.21 |
| 8,432,681 | B2 * | 4/2013 | Tung-Ke | G11B 33/124 361/679.33 |
| 8,562,086 | B1 * | 10/2013 | Baik | A47B 88/931 312/334.4 |
| 8,730,661 | B2 * | 5/2014 | Lai | G11B 33/08 361/679.33 |
| 9,265,183 | B2 * | 2/2016 | Sun | G11B 33/124 |
| 9,521,789 | B2 * | 12/2016 | Grossman | H05K 9/0037 |
| 10,159,164 | B2 * | 12/2018 | Liao | A47B 88/43 |
| 2007/0297129 | A1 * | 12/2007 | Liu | G06F 1/187 |
| 2008/0233858 | A1 | 9/2008 | Womac et al. | |
| 2008/0316698 | A1 * | 12/2008 | Yeh | G11B 33/08 361/679.33 |
| 2009/0097200 | A1 | 4/2009 | Sharma et al. | |
| 2009/0168325 | A1 * | 7/2009 | Yeh | G11B 33/124 361/679.33 |
| 2010/0085703 | A1 | 4/2010 | Duke et al. | |
| 2011/0102998 | A1 * | 5/2011 | Lin | G11B 33/1426 361/679.33 |
| 2011/0255235 | A1 * | 10/2011 | Chen | G06F 1/187 361/679.33 |
| 2011/0255236 | A1 * | 10/2011 | Sun | G11B 33/128 361/679.33 |
| 2023/0354543 | A1 * | 11/2023 | Demars | H05K 7/20272 |
| 2024/0114644 | A1 | 4/2024 | Gruppo et al. | |
| 2024/0114665 | A1 | 4/2024 | Shearman et al. | |

\* cited by examiner

200

BRACKET ASSEMBLY FOR MOUNTING ELECTRONICS UNITS IN RACKS

BACKGROUND

Field of the Disclosure

The present disclosure relates to electronics and, more specifically but not exclusively, to techniques for mounting electronics units in racks.

Description of the Related Art

This section introduces aspects that may help facilitate a better understanding of the disclosure. Accordingly, the statements of this section are to be read in this light and are not to be understood as admissions about what is prior art or what is not prior art.

In the telecom industry, it is customary to mount telecom equipment (referred to herein as "electronic units") onto racks following rack-mounting requirements as detailed by various industry standards. This ensures that uniform spacings are respected and standard mounting positions fit the racks' standardized mounting holes.

FIG. 1 is a perspective view showing an electronics unit 110 mounted onto two vertical posts 122(1) and 122(2) of a rack 120 using two L-shaped mounting brackets 130(1) and 130(2), according to a conventional mounting configuration.

FIG. 2 is a perspective view of a conventional, L-shaped mounting bracket 200 used to mount electronics units onto racks. As shown in FIG. 2, bracket 200 has (i) a unit flange 210 that gets attached to an electronics unit, such as electronics unit 110 of FIG. 1, using a set of (in this case, four) screws/bolts (not shown) that engage tapped openings in the sidewall of the electronics unit through (in this case, four) mounting holes 212 in the unit flange 210 and (ii) a rack flange 220, orthogonal to the unit flange 210, that gets attached to a vertical post of a rack, such as rack 120 of FIG. 1, using a set of (in this case, two) screws/bolts (not shown) that engage mounting holes in the vertical post through (in this case, two) mounting holes 222 in the rack flange 220.

As shown in the conventional mounting configuration of FIG. 1, the unit flanges of the brackets 130(1) and 130(2) are mounted flush with the sidewalls 112(1) and 112(2) of the electronics unit 110 with no gap between the unit flanges and the sidewalls.

When operating, conventional electronics units, such as electronics unit 110 of FIG. 1, generate heat that can adversely affect the operations and lifetime of those units. It is known to provide passive cooling (e.g., using heat sinks and thermal radiators) and active cooling (e.g., using fans) to maintain the temperatures of electronics units at acceptable levels.

SUMMARY

The conventional technique of mounting electronics units onto racks using brackets with the brackets' unit flanges mounted flush with the units' sidewalls inhibits the cooling of those units. Problems in the prior art are addressed in accordance with the principles of the present disclosure by techniques for mounting electronics units onto racks using bracket assemblies that provide air gaps between the brackets' unit flanges and the units' sidewalls that enhance both passive and active cooling of the units.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 3:
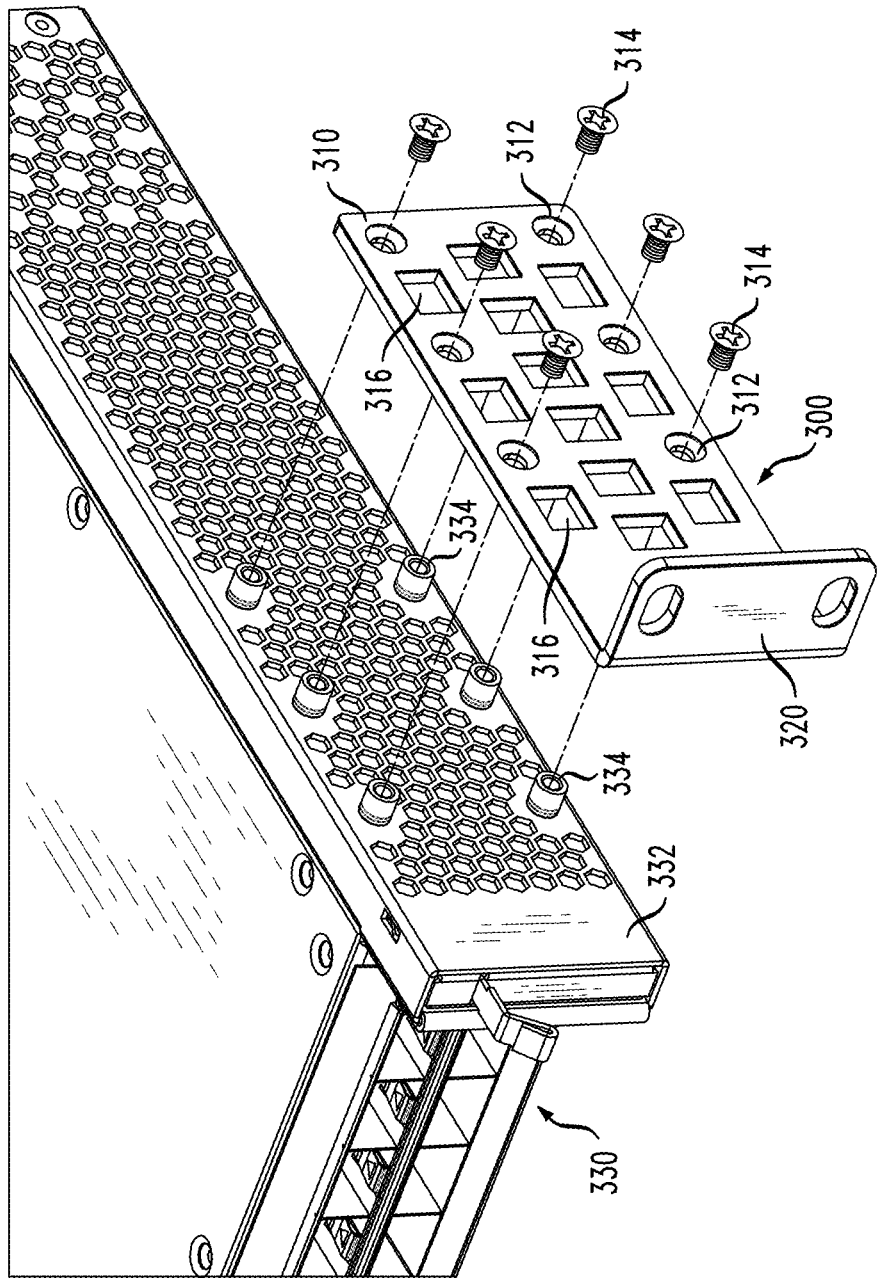
FIG. 3 is an exploded, perspective view of a mounting configuration according to certain embodiments of the present disclosure.

FIG. 3 is an exploded, perspective view of a mounting configuration according to certain embodiments of the present disclosure. FIG. 3 shows (i) an electronics unit 330 having a sidewall 332 with a set of (in this case, six) (e.g., permanently mounted) tapped standoffs 334 and (ii) an L-shaped bracket 300 having (a) a rack flange 320 that can be mounted onto a rack post (not shown) and (b) a unit flange 310 that is mounted onto the unit's sidewall 332 using (in this case, six) screws/bolts 314 that pass through untapped mounting holes 312 in the unit flange 310 and engage the unit's tapped standoffs 334. The outer diameters of the cylindrical standoffs 334 are larger than the diameters of the unit flange's mounting holes 312 such that, when fully assembled, the standoffs 334 prevent the unit flange 310 from being mounted flush onto the unit's sidewall 332.

Instead, there will be an air gap between the unit's sidewall 332 and bracket's unit flange 310 having a width equal to the height of the standoffs 334.

Figure 4:
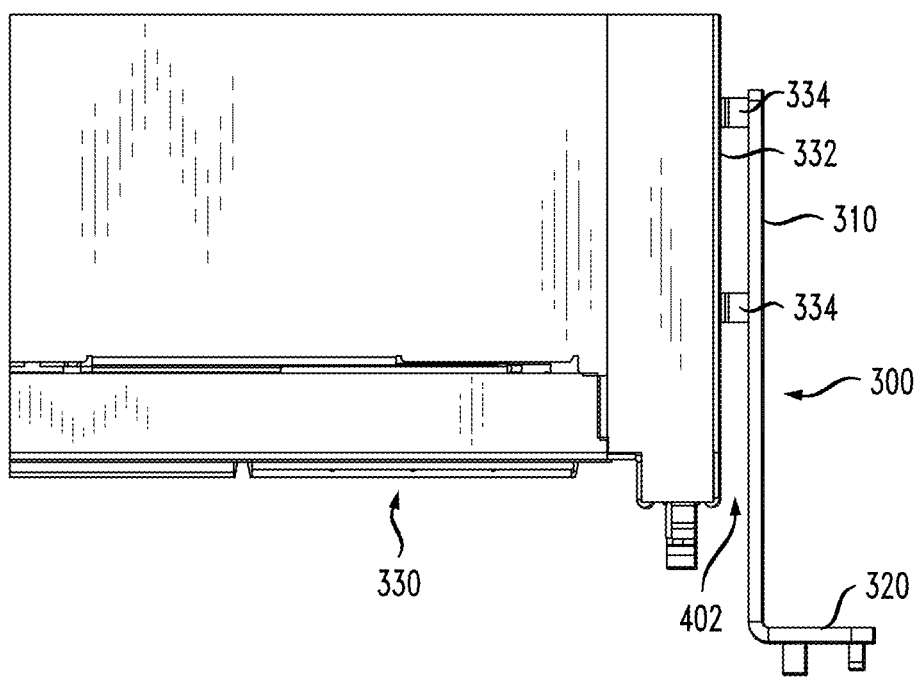
FIG. 4 is a top-down view of the bracket of FIG. 3 mounted onto the electronics unit of FIG. 3.

FIG. 4 is a top-down view of the bracket 300 of FIG. 3 fully mounted onto the electronics unit 330 of FIG. 3. As shown in FIG. 4, there is an air gap 402 between the unit's sidewall 332 and the bracket's unit flange 310 having a width equal to the height of the standoffs 334. This mounting technique enables air to flow within the air gap 402, thereby enhancing both passive and active cooling of the electronics unit 330.

As shown in FIG. 3, in addition to having the mounting holes 312, the unit flange 310 has (in this case, 12 rectangular) airflow openings 316 that further enhance both passive and active cooling of the electronics unit 330 by increasing the ability of air to flow into and out of the air gap 402.

Figure 1:
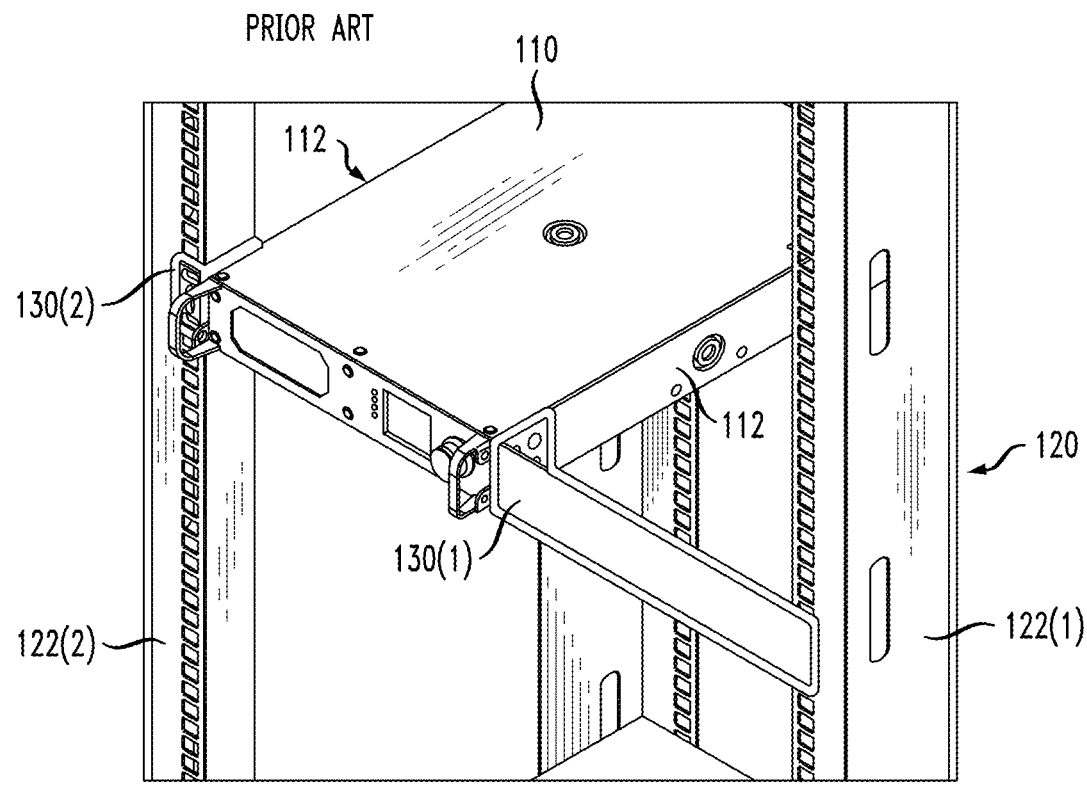
FIG. 1 is a perspective view showing an electronics unit mounted onto two vertical posts of a rack using two mounting brackets, according to a conventional mounting configuration.
Figure 2:
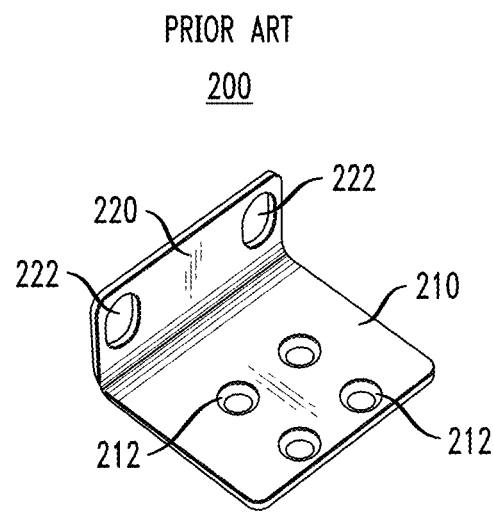
FIG. 2 is a perspective view of a conventional, L-shaped mounting bracket used to mount electronics units onto racks.
Figure 5A:
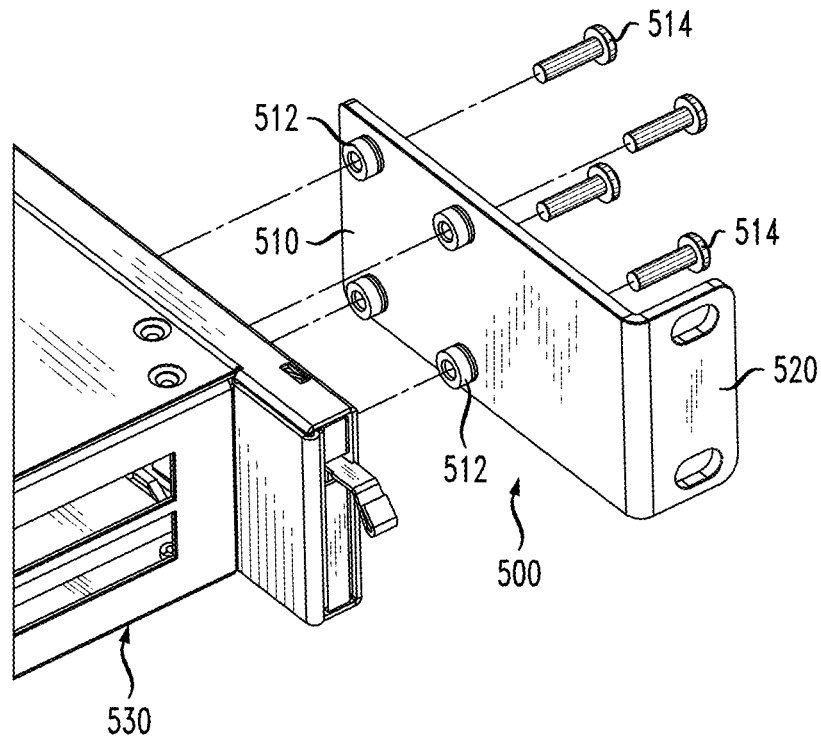
FIGS. 5A and 5B are respective, left and right, exploded, perspective views of a mounting configuration according to certain other embodiments of the present disclosure.
Figure 5B:
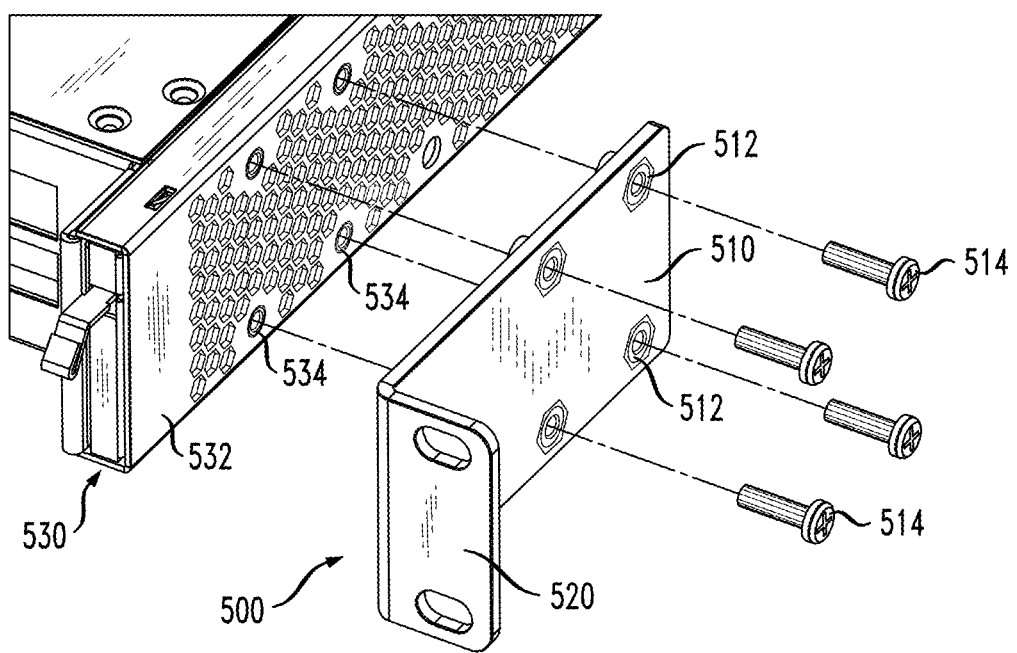

FIGS. 5A and 5B are respective, left and right, exploded, perspective views of a mounting configuration according to certain other embodiments of the present disclosure. The elements of FIGS. 5A and 5B are analogous to the elements of FIG. 1 with analogous elements having analogous labels. Instead of having tapped standoffs 334 mounted onto the unit's sidewall 332 as in the mounting configuration of FIG. 3, in the mounting configuration of FIGS. 5A and 5B, (i) (in this case, four) untapped standoffs 512 are (e.g., permanently) mounted into (in this case, four) holes 512 in the bracket's unit flange 510 and (ii) (in this case, four) screws/bolts 514 pass through the untapped standoffs 512 and engage (in this case, four) tapped holes 334 in the unit's sidewall 332.

Figure 6:
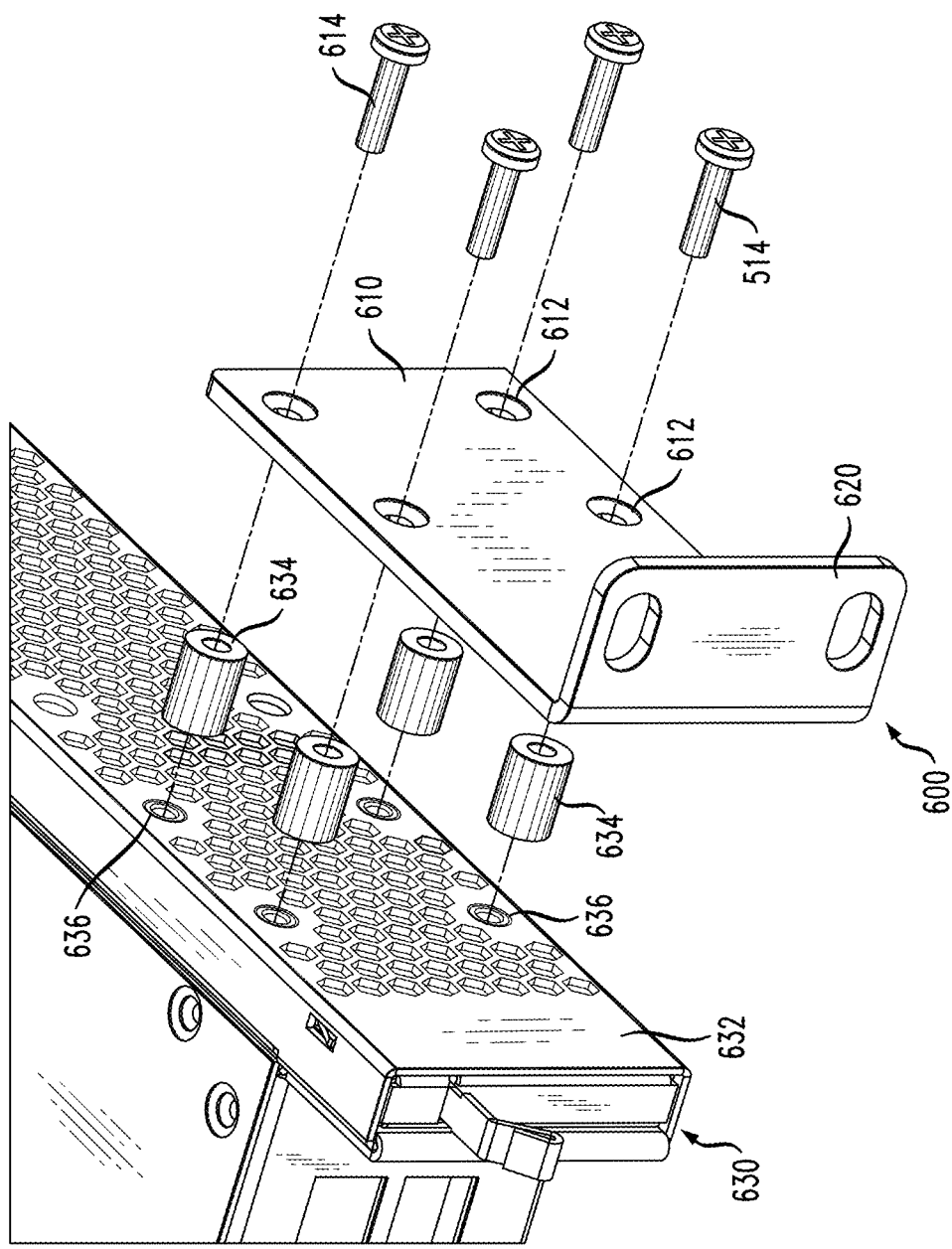
FIG. 6 is an exploded, perspective view of a mounting configuration according to certain other embodiments of the present disclosure.

FIG. 6 is an exploded, perspective view of a mounting configuration according to certain other embodiments of the present disclosure. The elements of FIG. 6 are analogous to the elements of FIGS. 5A and 5B with analogous elements having analogous labels. Instead of having untapped standoffs 512 mounted onto the bracket's unit flange 510 as in the mounting configuration 512 of FIGS. 5A and 5B, in the mounting configuration of FIG. 6, (in this case, four) untapped standoffs 634 are separate elements that are to be aligned between (in this case, four) untapped holes 612 in the bracket's unit flange 510 and (in this case, four) tapped holes 636 in the unit's sidewall 632, such that (in this case, four) screws/bolts 614 pass through the unit flange's untapped holes 612 and the untapped standoffs 634 and engage the sidewall's tapped holes 636.

Figure 7A:
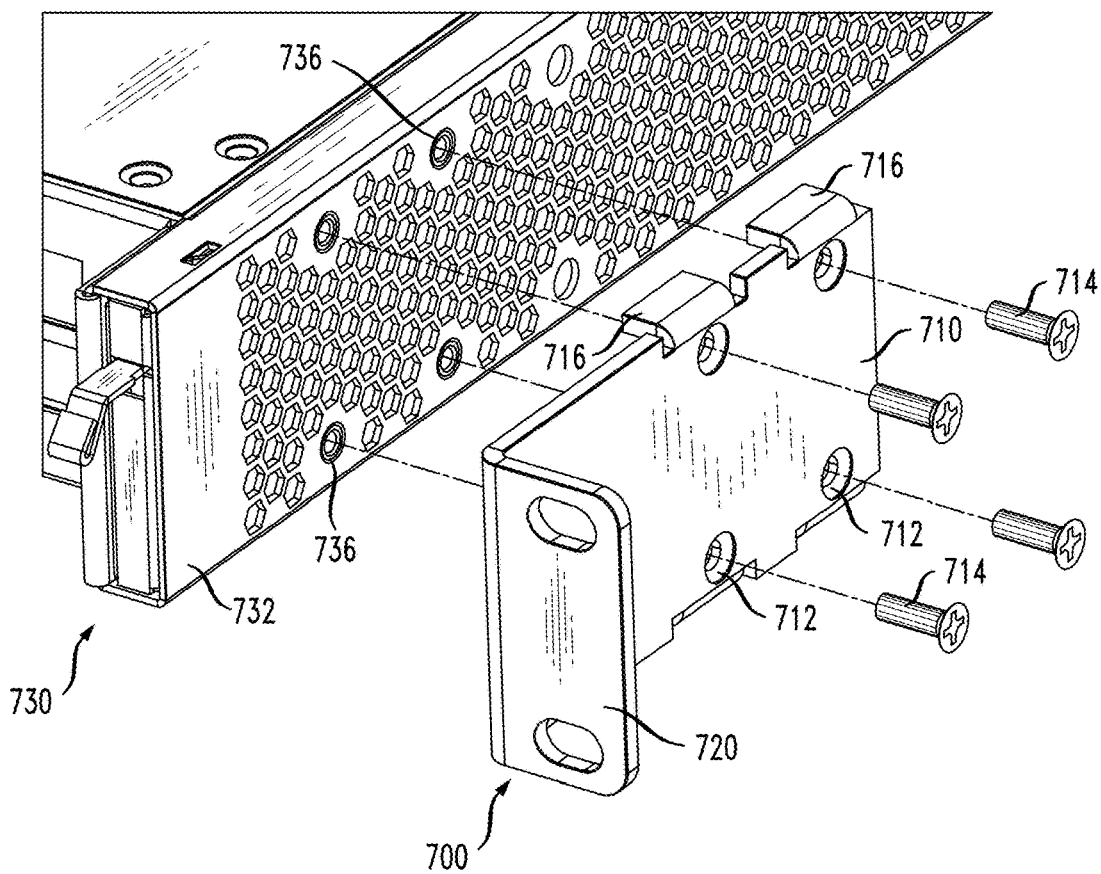
FIGS. 7A and 7B are respective, right and left, exploded, perspective views of a mounting configuration according to certain other embodiments of the present disclosure.
Figure 7B:
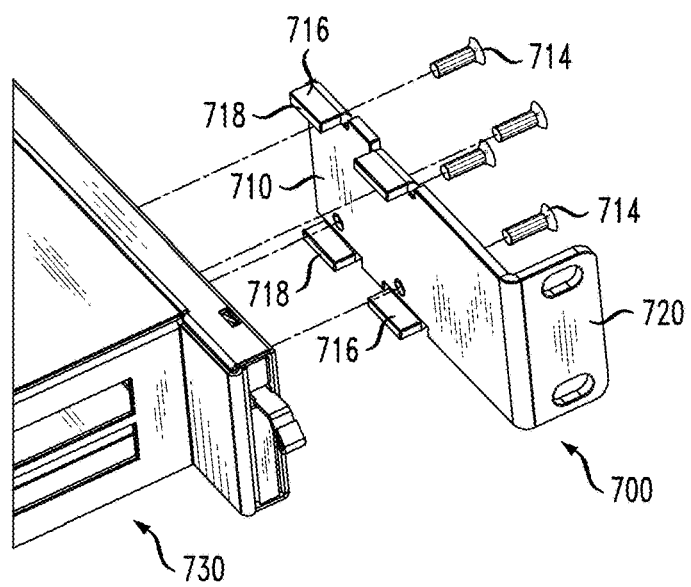

FIGS. 7A and 7B are respective, right and left, exploded, perspective views of a mounting configuration according to certain other embodiments of the present disclosure. The elements of FIGS. 7A and 7B are analogous to the elements of FIGS. 5A and 5B with analogous elements having analogous labels. Instead of having standoffs 512 mounted into holes 512 in the bracket's unit flange 510 as in the mounting configuration of FIGS. 5A and 5B, in the mounting configuration of FIGS. 7A and 7B, the bracket's unit flange 710 has (in this case, four) orthogonal standoffs 716 that extend from the unit flange 710 formed, for example, by bending tabs in a manner analogous to the bending used to form the rack flange 720. In this mounting configuration, (in this case, four) screws/bolts 714 pass through (in this case, four) untapped holes 712 in the unit flange 710 and engage (in this case, four) tapped holes 736 in the unit's sidewall 732 with the ends 718 of the standoffs 716 abutting the sidewall 732 away from the electronics unit's tapped holes 736, thereby establishing a gap between the sidewall 732 and the bracket 700.

In certain embodiments, the present disclosure is a bracket assembly for mounting an electronics unit onto a rack, the bracket assembly comprising (i) a bracket comprising a rack flange and a unit flange connected to the rack flange and (ii) one or more standoffs, wherein (a) the rack flange is configured to be mounted to a vertical post of the rack and (b) the unit flange is configured to be mounted to a sidewall of the electronics unit with the one or more standoffs interposed between the bracket's unit flange and the electronics unit's sidewall to create an air gap between the electronics unit and the bracket.

In at least some of the above embodiments, the unit flange is orthogonal to the rack flange.

In at least some of the above embodiments, the one or more standoffs are mountable to the electronics unit, each standoff having a tapped opening, and the unit flange has one or more untapped holes that enable the unit flange to be mounted to the electronics unit using one or more screws/bolts that pass through the unit flange's one or more untapped holes and engage the one or more tapped openings in the one or more standoffs.

In at least some of the above embodiments, the one or more standoffs are integral with or mountable onto the unit flange, each standoff having an untapped hole that aligns with a corresponding untapped hole in the unit flange, and the unit flange is mountable to the electronics unit using one or more screws/bolts that pass through the one or more untapped holes in the unit flange and the one or more untapped holes in the one or more standoffs and engage one or more tapped holes in the electronics unit.

In at least some of the above embodiments, each standoff is a separate element having an untapped hole, and the unit flange is mountable to the electronics unit using one or more screws/bolts that pass through one or more untapped holes in the unit flange and the one or more untapped holes of the one or more standoffs and engage one or more tapped holes in the electronics unit.

In at least some of the above embodiments, each standoff is a permanent part of the unit flange, and the unit flange is mountable to the electronics unit using one or more screws/bolts that pass through one or more untapped holes in the unit flange and engage one or more tapped holes in the electronics unit with the one or more standoffs abutting the electronic unit's sidewall away from the electronics unit's tapped holes.

In at least some of the above embodiments, the unit flange is perforated by one or more airflow openings.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1-only A; 2-only B; 3-both A and B.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A bracket assembly for mounting an electronics unit onto a rack, the bracket assembly comprising:
    a bracket comprising a rack flange and a unit flange connected to the rack flange; and
    one or more standoffs, wherein:
        the rack flange is configured to be mounted to a vertical post of the rack;
        the unit flange is configured to be mounted to a sidewall of the electronics unit with the one or more standoffs interposed between the bracket's unit flange and the electronics unit's sidewall to create an air gap between the electronics unit and the bracket;
        each standoff is a permanent, integral part of the unit flange; and
        the unit flange is mountable to the electronics unit using one or more screws/bolts that pass through one or more untapped holes in the unit flange and engage one or more tapped holes in the electronics unit with the one or more standoffs abutting the electronic unit's sidewall away from the electronics unit's tapped holes.

2. The bracket assembly of claim 1, wherein the unit flange is orthogonal to the rack flange.

3. The bracket assembly of claim 1, wherein the unit flange is perforated by one or more airflow openings.

4. A method for mounting the electronics unit of claim 1 to the rack of claim 1 using the bracket assembly of claim 1, the method comprising:
    mounting the rack flange to a vertical post of the rack; and
    mounting the unit flange to the electronics unit with the one or more standoffs interposed between the bracket's unit flange and the electronics unit's sidewall to create the air gap between the electronics unit and the bracket, wherein:
        each standoff is a permanent, integral part of the unit flange; and
        the unit flange is mounted to the electronics unit using one or more screws/bolts that pass through one or more untapped holes in the unit flange and engage one or more tapped holes in the electronics unit with the one or more standoffs abutting the electronic unit's sidewall away from the electronics unit's tapped holes.

5. The method of claim 4, wherein the unit flange is orthogonal to the rack flange.

6. The method of claim 4, wherein the unit flange is perforated by one or more airflow openings.

* * * * *